United States Patent
Deak et al.

(10) Patent No.: US 10,322,698 B2
(45) Date of Patent: *Jun. 18, 2019

(54) PRETENSIONING DEVICE FOR A WINDSCREEN WIPING DEVICE

(71) Applicant: Robert Bosch GmbH, Stuttgart (DE)

(72) Inventors: Peter Deak, Budapest (HU); Michael Weiler, Buehl (DE); Attila Geleta, Budapest (HU); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 96 days.

This patent is subject to a terminal disclaimer.

(21) Appl. No.: 15/328,560

(22) PCT Filed: Jul. 10, 2015

(86) PCT No.: PCT/EP2015/065798
§ 371 (c)(1),
(2) Date: Jan. 24, 2017

(87) PCT Pub. No.: WO2016/012267
PCT Pub. Date: Jan. 28, 2016

(65) Prior Publication Data
US 2017/0203730 A1    Jul. 20, 2017

(30) Foreign Application Priority Data
Jul. 24, 2014   (DE) ........................ 10 2014 214 577

(51) Int. Cl.
*B60S 1/34*      (2006.01)
*B60S 1/38*      (2006.01)

(52) U.S. Cl.
CPC .......... *B60S 1/3801* (2013.01); *B60S 1/3411* (2013.01); *B60S 2001/3812* (2013.01); *B60S 2001/3813* (2013.01)

(58) Field of Classification Search
CPC ...... B60S 1/3801; B60S 1/3411; B60S 1/347; B60S 1/3472; B60S 1/38; B60S 2001/3812; B60S 2001/3813; B60S 2001/3815

(Continued)

(56) References Cited

U.S. PATENT DOCUMENTS 2,596,063 A * 5/1952 Anderson ............. B60S 1/3801
15/250.44
3,177,514 A * 4/1965 Wise ..................... B60S 1/3801
15/250.452

(Continued)

FOREIGN PATENT DOCUMENTS

DE     102013214064    5/2014
EP         0930207      7/1999

(Continued)

OTHER PUBLICATIONS

Machine translation of description portion of French publication 1033521, published Jul. 1953.*

(Continued)

*Primary Examiner* — Gary K. Graham
(74) *Attorney, Agent, or Firm* — Michael Best & Friedrich LLP (57) ABSTRACT

The present invention relates to a windscreen wiping device (100) for a vehicle, comprising a wiper blade (2) with an elongate upper part (10) and an elongate lower part (12), which are configured to be at least partially bendable. Furthermore, a plurality of connecting elements (18) for connecting the upper part (10) and the lower part (12) are provided, said connecting elements being spaced apart from one another along a longitudinal extent (8) of the windscreen wiping device and being designed to permit a movement of the upper part (10) and of the lower part relative to each other with a movement component along a longitudinal (Continued)

Fig. 2 extent (8) of the windscreen wiping device. Furthermore, the windscreen wiping device has a pretensioning device (50), wherein the pretensioning device has a force-absorbing element (32) which is connected to a force transmission element (33) such that, in the event of a dynamic effect on the force-absorbing element (32) in the direction of the elongate lower part (12), a rotational movement of the force transmission element (33) is brought about, thus resulting in a movement of the elongate upper part (10) relative to the elongate lower part with a movement component along a longitudinal extent (8) of the windscreen wiping device.

18 Claims, 7 Drawing Sheets

(58) Field of Classification Search
USPC ............ 15/250.361, 250.44, 250.43, 250.39, 15/250.38, 250.47
See application file for complete search history.

(56) References Cited

U.S. PATENT DOCUMENTS

| | | | | |
|---|---|---|---|---|
| 3,218,664 A | * | 11/1965 | Wise | ............... B60S 1/3801 |
| | | | | 15/250.44 |
| 3,224,028 A | | 12/1965 | Lucien et al. | |
| 3,263,262 A | * | 8/1966 | Wise | ............... B60S 1/3801 |
| | | | | 15/250.32 |

FOREIGN PATENT DOCUMENTS

| | | | |
|---|---|---|---|
| FR | 1033521 | * | 7/1953 |
| FR | 2712859 | | 6/1995 |
| GB | 1425568 | * | 2/1976 |
| WO | 2015032573 | | 3/2015 |

OTHER PUBLICATIONS

International Search Report for Application No. PCT/EP2015/065798 dated Oct. 8, 2015 (English Translation, 3 pages).

* cited by examiner

PRETENSIONING DEVICE FOR A WINDSCREEN WIPING DEVICE

BACKGROUND OF THE INVENTION

The invention relates to a windshield wiper device for a vehicle, in particular a motor vehicle, and furthermore in particular to a pretensioning device for a windshield wiper device.

Windshield wiper devices typically have a wiper arm or wiper lever, wherein a wiper blade is moved over the windshield of a motor vehicle. The wiper blade is moved here between a first turning position and a second turning position. For this purpose, the wiper arm is connected via the drive shaft to a wiper motor. In particular on windshields having pronounced changes in curvature, the wiper blade easily loses contact with the windshield. This may result, in particular in the case of windshields having a pronounced curvature, in wiping areas not being wiped or in smearing.

Since a wiping operation has to be optimized for a multiplicity of parameters, such as, for example, the amount of rain falling on the windshield, a possible snow loading occurring on the windshield, the speed of the vehicle and associated wind pressure on the wiper arm, smearing cannot be reliably prevented in a simple manner by adaptation of the pressure of the wiper arm on the windshield. There is therefore a need for further improvement of windshield wiper devices.

There are a plurality of boundary conditions which should additionally be taken into consideration for improvement purposes. These include the outlay on production or the production costs, the material costs, but also the properties of the windshield wiper device, in particular the operation under diverse conditions and the durability under a multiplicity of conditions. It should be taken into consideration here in the case of wiper devices for vehicles that the cost pressure is constantly rising and that the vehicles may be used in a multiplicity of climatic conditions, and therefore, for example, extreme temperature values occur permanently and/or with great fluctuations.

SUMMARY OF THE INVENTION

It is the object of the present invention to ensure a reliable, substantially smear-free wiping of a windshield of a vehicle.

According to embodiments of the present invention, a windshield wiper device for a vehicle, in particular a motor vehicle, is proposed. The windshield wiper device comprises a wiper blade with an elongate upper part and an elongate lower part, which are configured to be at least partially bendable. Furthermore, a plurality of connecting elements for connecting the upper part and the lower part are provided, wherein the connecting elements are spaced apart from one another along a longitudinal extent of the windshield wiper device. The connecting elements are designed in order to permit a movement of the upper part and of the lower part relative to each other with a movement component along a longitudinal extent of the windshield wiper device. Furthermore, the windshield wiper device has a pretensioning device, wherein the pretensioning device comprises a force absorption element which is connected to a force transmission element, and therefore, in the event of an action of force on the force absorption element in the direction of the elongate lower part, a rotational movement of the force transmission element is brought about, as a result of which a movement of the elongate upper part relative to the elongate lower part results, with a movement component along a longitudinal extent of the windshield wiper device.

Preferred embodiments and particular aspects of the invention emerge from the dependent claims, the drawings and the description here.

According to the embodiments of the invention that are described here, windshield wiper devices for vehicles can be produced in a particularly favorable manner and for a plurality of different fields of use. The present embodiments of the windshield wiper device with the pretensioning device according to the embodiments described herein permit particularly good adaptation to the curvature of a windshield. This ensures a particularly good and exact wiping of the windshield. Unwiped regions of the windshield and smearing on the windshield can be substantially avoided. The structural configuration of the pretensioning device described herein permits a substantially uniform contact pressure of the windshield wiper device on the windshield, and therefore high wiping quality is provided.

According to embodiments of the windshield wiper device that may be combined with other embodiments, the pretensioning device comprises a stop, which is spaced apart from the lower part, in order to determine a ratio between a pretensioning force $F_V$ and a contact pressure force $F_P$ of the windshield wiper device. A windshield wiper device is therefore provided with which the ratio between a pretensioning force $F_V$ and a contact pressure force $F_P$ can be set, and therefore a better wiping result is achieved in comparison to conventional windshield wiper devices.

According to embodiments of the windshield wiper device that may be combined with other embodiments, the force transmission element is connected at a first end via a first rotary joint to the elongate upper part. Furthermore, the force transmission element is connected at a second end via a second rotary joint to the force absorption element. As a result, a pretensioning force $F_V$ acting on the upper part, in particular in the direction of the longitudinal extent of the upper part, can be effectively generated in a simple manner by means of the pretensioning device.

According to embodiments of the windshield wiper device that may be combined with other embodiments, the force transmission element is arranged in such a manner that, in an unloaded state of the windshield wiper device, an angle α between a longitudinal axis of the force transmission element and a perpendicular to a direction of movement of the force absorption element in the event of an action of force on the force absorption element is within an angular range of at least 15°, in particular of at least 20°, to at maximum 60°, in particular to at maximum 45°. The ratio between a pretensioning force $F_V$ and a contact pressure force $F_P$ can be set by the selection of the angle α between the longitudinal axis of the force transmission element and the perpendicular to a direction of movement of the force absorption element.

According to embodiments of the windshield wiper device that may be combined with other embodiments, the stop is connected to the force absorption element, wherein the stop is configured in order, in the event of an action of force on the force absorption element, to limit a movement of the force absorption element in the direction of the elongate lower part to a maximum movement distance of 20 mm, in particular 15 mm, in particular 10 mm. A windshield wiper device is therefore provided with which the ratio between a pretensioning force $F_V$ and a contact pressure force $F_P$ can be set, and therefore a better wiping result is achieved in comparison to conventional windshield wiper devices.

According to embodiments of the windshield wiper device that may be combined with other embodiments, the stop is designed in the shape of a pin and is arranged in order to form a stop with the elongate lower part at the maximum movement distance of the force absorption element. A simple and cost-effective pretensioning device for a windshield wiper device according to the embodiments described herein is therefore provided.

According to embodiments of the windshield wiper device that may be combined with other embodiments, a guide is provided in order to guide a movement of the force absorption element in the direction of the elongate lower part. A particularly stable pretensioning device for a windshield wiper device can therefore be provided.

According to embodiments of the windshield wiper device that may be combined with other embodiments, furthermore a wiper arm is provided in order to exert a compressive force on the force absorption element. A windshield wiper device is therefore provided with which a compressive force can be exerted in a simple manner on the force absorption element, and therefore pretensioning of the windshield wiper device is realized.

According to embodiments of the windshield wiper device that may be combined with other embodiments, furthermore a tension generation device is provided in order to exert a tensile force on the force absorption element. A windshield wiper device with a low overall height and compact construction can therefore be provided since, for example, a wiper arm for applying a force to the force absorption element can be omitted.

According to embodiments of the windshield wiper device that may be combined with other embodiments, the stop is configured in order to transmit a force of at least 10 N, in particular at least 15 N, in particular at least 20 N to the elongate lower part. A windshield wiper device can therefore be provided which permits a high contact pressure.

According to a further embodiment of the windshield wiper device for a vehicle, in particular a motor vehicle, the windshield wiper device comprises a wiper blade 2 with an elongate upper part 10, which is configured to be at least partially bendable, an elongate lower part 12, which is configured to be at least partially bendable, and a plurality of connecting elements 18 for connecting the upper part 10 and the lower part 12, wherein the connecting elements 18 are spaced apart from one another along a longitudinal extent 8 of the windshield wiper device. The connecting elements 18 are designed in order to permit a movement of the upper part 10 and of the lower part relative to each other with a movement component along a longitudinal extent 8 of the windshield wiper device. Furthermore, the windshield wiper device comprises a pretensioning device, wherein the pretensioning device comprises a tension generation device 41 which is connected to the lower part 12, and therefore, when a tensile force is exerted on the lower part 12 in the longitudinal extent of the wiper blade, a contraction of the elongate lower part is brought about, as a result of which a movement of the elongate lower part 12 relative to the elongate upper part results with a movement component along a longitudinal extent of the windshield wiper device. As a result, a windshield wiper device can be provided which is placed and adapted in a particularly exact manner against and to the curvature of the windshield. In particular, a windshield wiper device with a lower overall height and therefore a compact construction of the windshield wiper device is thereby provided since, for example, a wiper arm for applying a force to the force absorption element can be omitted.

BRIEF DESCRIPTION OF THE DRAWINGS

Exemplary embodiments of the invention are illustrated in the figures and are described in more detail below. In the figures.

DETAILED DESCRIPTION

The same reference signs are used below for identical elements and elements of identical effect, unless stated otherwise.

Figure 1:
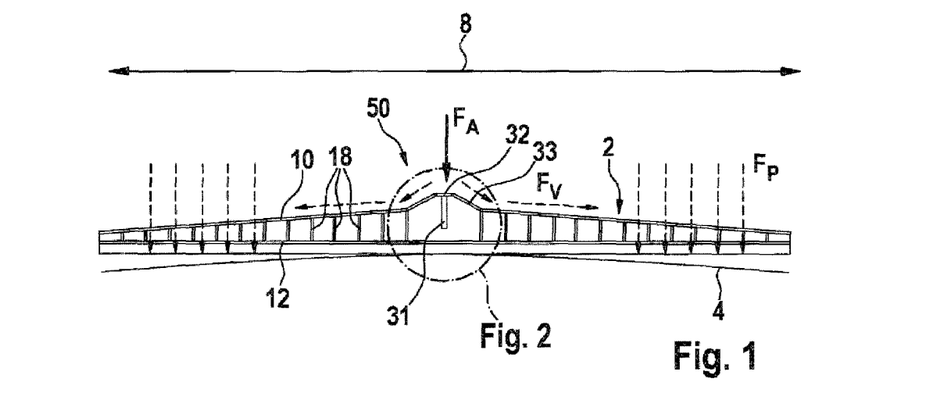
FIG. 1 shows a schematic illustration of a wiper blade with a pretensioning device according to embodiments of the windshield wiper device.

FIG. 1 schematically illustrates a windshield wiper device with a wiper blade and a pretensioning device of the windshield wiper device according to embodiments of the disclosure. The windshield wiper device comprises a wiper blade 2 with an elongate upper part 10 and an elongate lower part 12, which are configured to be at least partially bendable. Furthermore, a plurality of connecting elements 18 for connecting the upper part 10 and the lower part 12 are provided, wherein the connecting elements 18 are spaced apart from one another along a longitudinal extent of the windshield wiper device. The connecting elements 18 are designed in order to permit a movement of the upper part 10 and of the lower part 12 relative to each other with a movement component along a longitudinal extent 8 of the windshield wiper device. Furthermore, the windshield wiper device has a pretensioning device, wherein the pretensioning device comprises a force absorption element 32 which is connected to a force transmission element 33, and therefore, in the event of an action of force on the force absorption element 32 in the direction of the elongate lower part 12, a rotational movement of the force transmission element 33 is brought about, as a result of which a movement of the elongate upper part 12 relative to the elongate lower part 12 results, with a movement component along a longitudinal extent 8 of the windshield wiper device.

A windshield wiper device is therefore provided which permits particularly good adaptation to the curvature of a windshield. As a result, a particularly good and exact wiping of the windshield can be ensured. Unwiped regions of the windshield and smearing on the windshield can be substantially avoided. Furthermore, the structural configuration of the windshield wiper device described herein permits precise adaptation of the windshield wiper device to changes in curvature occurring within the windshield. A substantially uniform contact pressure against the windshield wiper device, in particular against the lower part thereof, is achieved even in the event of pronounced curvatures and changes in curvature of the windshield. Compared to conventional windshield wiper devices, it is advantageously not required, in the case of the windshield wiper device according to the invention, to undertake a previous adjustment of the upper part and/or the lower part to the curvature of the windshield to be wiped. In the case of the windshield wiper device according to the invention, the adaptation to the curvature of the windshield takes place rapidly, without complications and substantially automatically. For the sake of simplicity, one and the same windshield wiper device can therefore be used for a large number of vehicles.

FIG. 1 illustrates the wiper blade 2 in a position not placed against the windshield such that the lower part 12 is configured substantially rectilinearly. According to further embodiments that may be combined with other embodiments, the lower part is configured convexly in the unloaded state, i.e. with an arch which protrudes in a central region away from the upper part. The windshield wiper devices according to the embodiments described here, upon contact with a windshield starting from the convex shape of the lower part, can then typically assume the corresponding concave shape of the lower part, which shape is adapted to the windshield.

According to embodiments of the windshield wiper device that may be combined with other embodiments, as illustrated by way of example in FIG. 1, the pretensioning device is connected to the upper part 10 of the wiper blade 2 in order to generate a pretensioning force $F_V$ acting on the upper part, in particular in the direction of the longitudinal extent of the upper part. As is shown in FIGS. 3A and 3B, pretensioning of the windshield wiper device can be brought about by exertion of a force $F_A$ on the force absorption element 32. For this purpose, the force transmission element 33 is connected at a first end via a first rotary joint 36 to the elongate upper part 10 and at a second end of the force transmission element 33 via a second rotary joint 37 to the force absorption element 32, as illustrated by way of example in FIG. 2.

If, as is shown by way of example in FIGS. 3A and 3B, the force absorption element 32 is moved in the direction of the elongate lower part when a force $F_A$ is exerted, for example by means of a wiper arm, a rotational movement of the force transmission element 33 is thereby brought about, as a result of which the second rotary joint 37 is displaced outward in the longitudinal direction of the windshield wiper device, and a compressive force 56 is exerted in the longitudinal extent of the windshield wiper device.

According to further embodiments of the windshield wiper device that may be combined with other embodiments, the pretensioning device 50 comprises a stop 31, which is spaced apart from the lower part 12, in order to determine a ratio between a pretensioning force $F_V$ and a contact pressure force $F_P$ of the windshield wiper device. The stop 31 is typically arranged below the force absorption element 32. According to embodiments of the windshield wiper device that may be combined with other embodiments, the distance between the stop 31 and the lower part 12 is at most 15 mm, in particular at most 10 mm, in particular at most 5 mm. According to embodiments of the disclosure, the pretensioning device 50 is configured such that the ratio between the pretensioning force $F_V$ and the contact pressure force $F_P$ can be determined to a value of at least 0.2, in particular at least 0.4, in particular at least 0.6.

Figure 2:
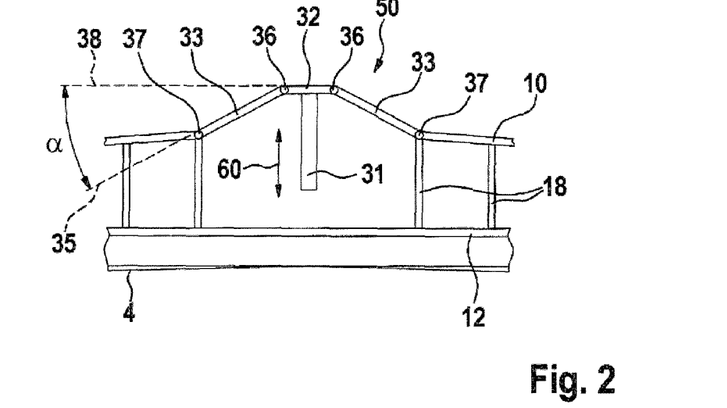
FIG. 2 shows a schematic illustration of a pretensioning device of a windshield wiper device according to embodiments of the disclosure.
Figure 3A:
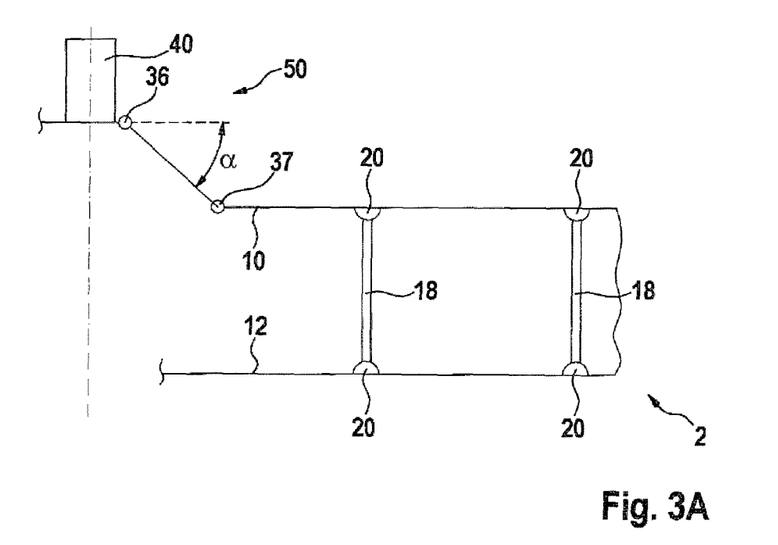
FIG. 3A shows a schematic illustration of a detail of a windshield wiper device with a wiper arm as pressure generation device in a basic position according to embodiments of the windshield wiper device.
Figure 3B:
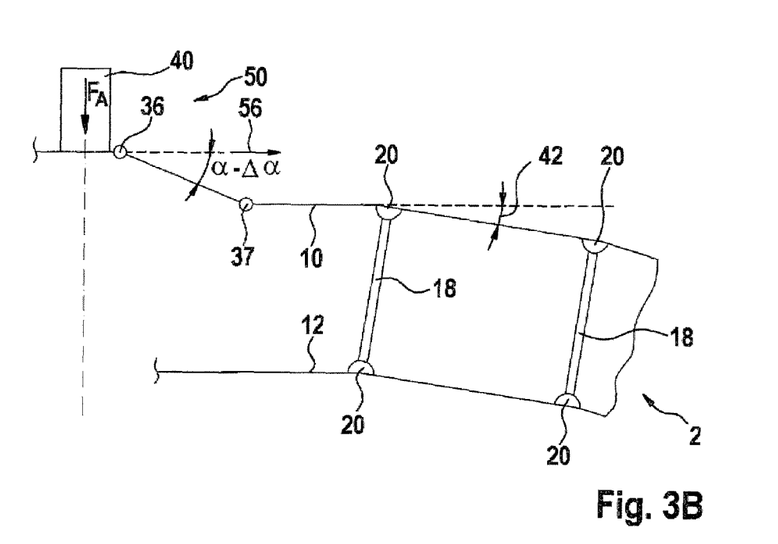
FIG. 3B shows a schematic illustration of a detail of a windshield wiper device according to FIG. 3A in a position placed against a windshield.

As shown by way of example in FIG. 2, the force transmission element 33 according to embodiments of the windshield wiper device that may be combined with other embodiments is arranged in such a manner that, in an unloaded state of the windshield wiper device, a longitudinal axis 35 of the force transmission element 33 and a perpendicular 38 to a direction of movements 60 of the force absorption element 33 encloses an angle α in the event of an action of force on the force absorption element 33. The pretensioning device is typically configured in such a manner that the angle α lies within an angular range of at least 10°, in particular of at least 15°, in particular of at least 20°, to at maximum 60°, in particular to at maximum 45°, in particular to at maximum 30°.

As is illustrated by way of example in FIG. 2, the stop 31 according to typical embodiments of the windshield wiper device is connected to the force absorption element 32. In particular, the stop 31 can be configured in order, in the event of an action of force on the force absorption element 32, to limit a movement of the force absorption element 32 in the direction of the elongate lower part 12 to a maximum movement distance of 20 mm, in particular 15 mm, in particular 10 mm. For example, the stop 31 can be designed in the shape of a pin. Furthermore, the stop 31 is typically designed in respect of stiffness such that, after the maximum movement distance of the force absorption element 32, a defined stop position can be formed with the elongate lower part 12.

FIG. 3A shows a schematic illustration of a detail of a windshield wiper device according to embodiments of the disclosure with a wiper arm 40 as pressure generation device in a basic position. The wiper arm 40 is typically connected to that end of the upper part 10 on which a holder 6, as illustrated for example in FIGS. 6A and 6B, for the wiper arm is arranged. That end of the upper part 10 which is connected to the wiper arm 40 can be guided in its end region by a guide (not illustrated). The wiper arm 40 can exert a force F transversely with respect to the longitudinal extent of the windshield wiper device such that pretensioning is generated and the windshield wiper device is pressed against the windshield. As is illustrated in FIG. 3B, by a force of the wiper arm being exerted in the direction of the windshield, a compressive force 56 is exerted on the upper part 10 in the longitudinal extent of the windshield wiper device. By means of the compressive force 56, the upper part 10 and the lower part 12 are bent downwards in the direction of the windshield. The compressive force 56 is transmitted to the lower part 12 via the connecting elements 18.

Figure 4A:
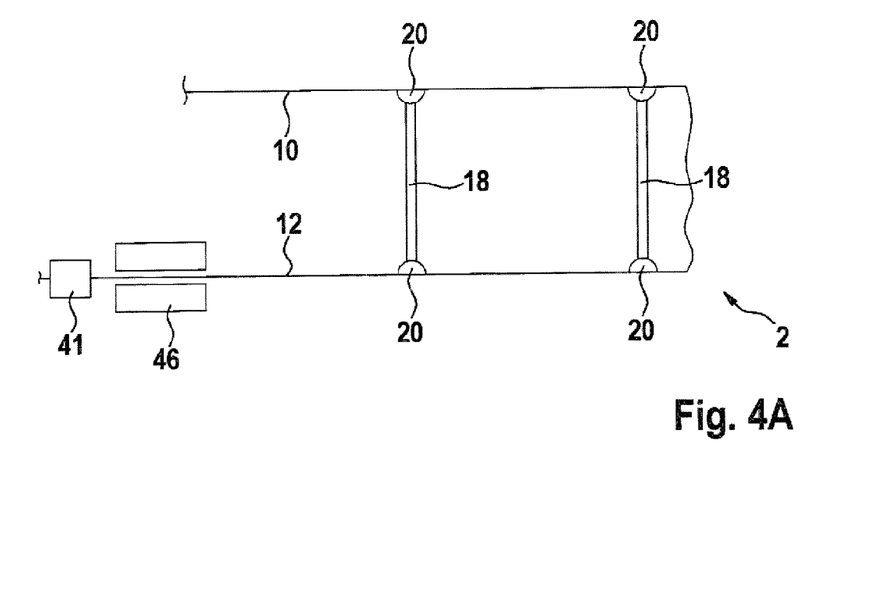
FIG. 4A shows a schematic illustration of a detail of a windshield wiper device with a tension generation device in a basic position according to embodiments of the windshield wiper device.
Figure 4B:
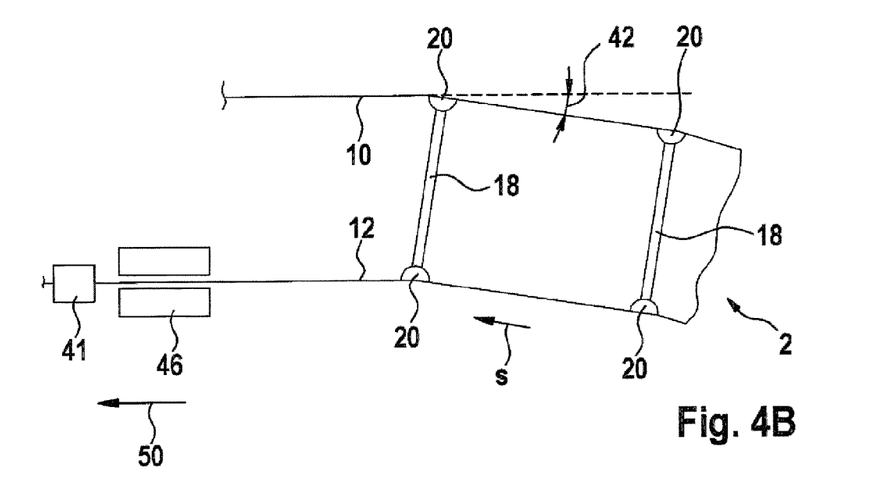
FIG. 4B shows a schematic illustration of a detail of a windshield wiper device according to FIG. 4A in a position placed against a windshield.

FIG. 4 shows a schematic illustration of a detail of a windshield wiper device with a tension generation device 41 in a basic position (FIG. 4A) and in a position (FIG. 4B) in which the windshield wiper device is placed against a windshield.

According to a further embodiment of the windshield wiper device for a vehicle, in particular a motor vehicle, the windshield wiper device comprises a wiper blade 2 with an elongate upper part 10, which is configured to be at least partially bendable, an elongate lower part 12, which is configured to be at least partially bendable, and a plurality of connecting elements 18 for connecting the upper part 10 and the lower part 12, wherein the connecting elements 18 are spaced apart from one another along a longitudinal extent 8 of the windshield wiper device. The connecting elements 18 are designed in order to permit a movement of the upper part 10 and of the lower part relative to each other with a movement component along a longitudinal extent 8 of the windshield wiper device. Furthermore, the windshield wiper device comprises a pretensioning device, wherein the pretensioning device comprises a tension generation device 41 which is connected to the lower part 12, and therefore, when a tensile force is exerted on the lower part 12 in the longitudinal extent of the wiper blade, a contraction of the elongate lower part is brought about, as a result of which a movement of the elongate lower part 12 relative to the elongate upper part results with a movement component along a longitudinal extent of the windshield wiper device.

According to embodiments of the windshield wiper device with a tension generation device, that end region of the lower part which is connected to the pressure generation device 41 can be guided by a guide 46. The tension generation device 41 can be an actuator, for example a piezo-actuator, which can carry out contractions in length. For this purpose, the tension generation device 41 can be connected to a control unit which activates the tension generation device, in particular the actuator, by means of suitable electrical signals. According to embodiments of the disclosure, the control unit is configured in such a manner that it determines the suitable activation signals for the tension generation device on the basis of the curvature of the windshield. As is illustrated in FIG. 3B, in the event of such a contraction to the lower part 12, a tensile force 50 is exerted in the longitudinal extent of the windshield wiper device. As a result, the windshield wiper device, in particular the lower part thereof, can be placed and adapted in a particularly exact manner against and to the curvature of the windshield. The tensile force is transmitted here to the upper part 10 in particular by means of the connecting elements 18.

Figure 5A:
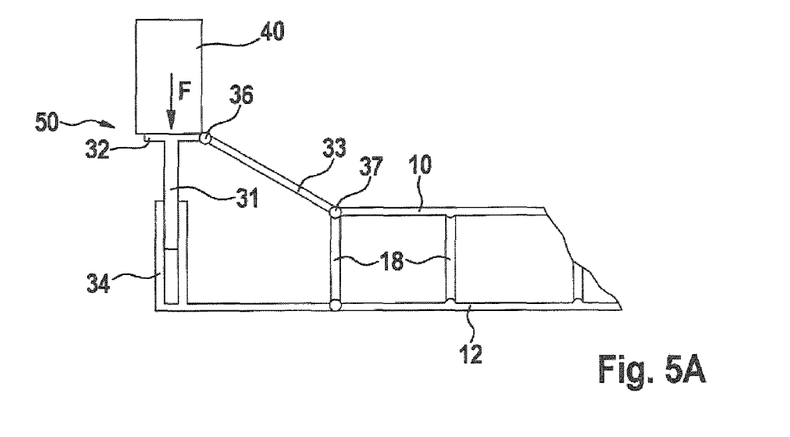
FIG. 5A shows a schematic illustration of a detail of a windshield wiper device in a basic position with a guide for the stop of a pressure generation device according to embodiments of the windshield wiper device.

According to embodiments of the windshield wiper device, as is illustrated by way of example in FIG. 5A, the windshield wiper device comprises a guide 34 for the stop 31. The guide 34 can be arranged in such a manner that the stop 31 is guided in the direction of the elongate lower part 12. The movement of the stop 31 in the direction of the elongate lower part 12 can be carried out by means of a pressure generation device, for example by means of a wiper arm 40, as illustrated schematically in FIG. 5A, or by means of a tension generation device 41, as illustrated by way of example in FIG. 5B. Both in FIG. 5A and in FIG. 5B, the windshield wiper device is illustrated in a basic position.

Figure 5B:
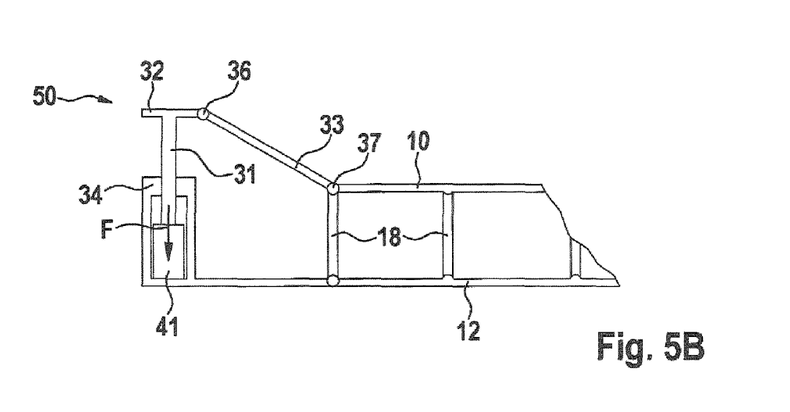
FIG. 5B shows a schematic illustration of a detail of a windshield wiper device in a basic position with a guide for the stop of a tension generation device according to embodiments of the windshield wiper device.

According to embodiments of the windshield wiper device, in which a tension generation device 41 is used, the tension generation device 41 can be realized in such a manner that the stop 31 is at least partially moved inside the tension generation device 41 during a movement in the direction of the elongate lower part 12. The stop 31 can be realized here in such a manner that it can be at least partially recessed into the tension generation device 41, as indicated in FIG. 5B.

According to embodiments of the windshield wiper device that may be combined with other embodiments described herein, the stop 31 can be configured in order to transmit a force of at least 10 N, in particular at least 15 N, in particular at least 20 N to the elongate lower part 12.

Illustrative embodiments of the windshield wiper device for which the pretensioning device described herein can be advantageously used are described below.

Figure 6A:
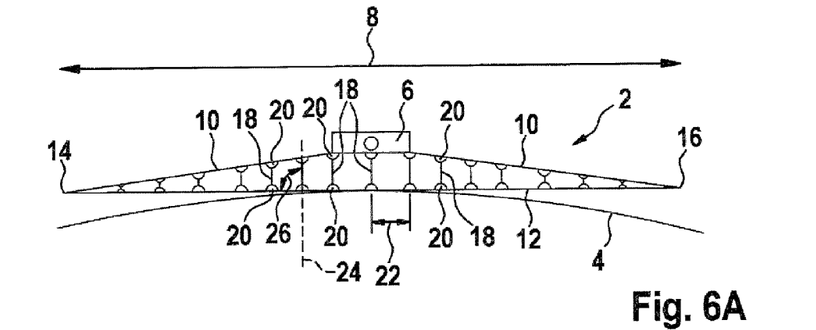
FIG. 6A shows a schematic illustration of a wiper blade of a windshield wiper device according to embodiments of the disclosure in a basic position.
Figure 6B:
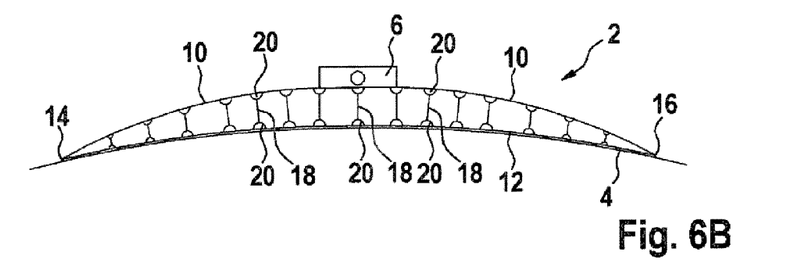
FIG. 6B shows a schematic illustration of the wiper blade of a windshield wiper device according to embodiments of the disclosure according to FIG. 6A in a position placed against a windshield.

FIG. 6A and 6B show schematic illustrations of a wiper blade 2 in a basic position (FIG. 6A) and in a position placed against a windshield (FIG. 6B) according to embodiments of the windshield wiper device of the disclosure. The wiper blade 2 serves for wiping a windshield 4 of a vehicle, which is, for example, a motor vehicle, in particular a car. The wiper blade 2 is customarily attached to a windshield wiper arm which is driven for wiping purposes by means of a motor. For this purpose, the wiper blade 2 has a holder 6 at which it can be fastened to the windshield wiper arm. In FIG. 6A, the wiper blade 2 is in a basic position in which it is at least partially lifted off the windshield 4. The wiper blade 2 has a longitudinal extent 8 and has an elongate upper part 10 and a likewise elongate lower part 12. The longitudinal extent of the upper part 10 and of the lower part 12 substantially correspond to the longitudinal extent 8 of the wiper blade 2.

Both the upper part 10 and the lower part 12 are bendable beams or may be configured as bendable beams which, in FIG. 6A and 6B, are in an exemplary manner in each case formed in one piece. This makes it possible to realize a particularly stable construction. It is likewise possible for only in each case one part of the upper part 10 and/or of the lower part 12 to be configured to be bendable. Furthermore, it is alternatively possible for the upper part 10 to be configured in two parts, wherein then the two parts of the two-part upper part 10 are both fastened to the holder 6 by one end each.

According to some embodiments that may be combined with the other embodiments described here, a material that has a modulus of elasticity in a range between 0.005 kN/mm$^2$ and 0.5 kN/mm$^2$, in particular 0.01 kN/mm$^2$ and 0.1 kN/mm$^2$, is used for the upper part 10 and/or the lower part 12. This permits suitable bendability of the upper part 10 and of the lower part 12. Together with a suitably configured cross-sectional area of the upper part 10 and of the lower part 12, optimum flexural rigidity is thus attained. The upper part 10 and the lower part 12 are arranged so as to be situated opposite each other. Both ends of the upper part 10 are fixedly connected at outer connecting positions 14 and 16 to one end of the lower part 12 each. The upper part 10 and the lower part 12 are otherwise spaced apart from each other.

The upper part 10 and the lower part 12 are connected to each other by connecting elements 18. In particular in the basic position of the wiper blade 2, said connecting elements run approximately transversely with respect to the longitudinal extent 8 of the wiper blade 2. The connecting elements 18 are fastened by means of rotary joints 20 to mutually facing inner longitudinal sides of the upper part 10 and of the lower part 12. The rotary joints 20 are hinges here. In particular, the rotary joints 20 may be in the form of film hinges. This is advantageous in particular if upper part 10, lower part 12 and/or connecting elements 18 are produced from a plastics material or are coated with a suitable plastics material.

According to typical embodiments described here, that may be combined with other embodiments described here, a rotary joint is selected from the following group consisting of: a hinge, a film hinge, a narrowing of the material for the purpose of generating reduced rigidity along a torsional axis, a joint with an axis of rotation, a means for connecting the upper part to the connecting element or for connecting the lower part to the connecting element, which means permits the displacement of the lower part in relation to the upper part along the longitudinal extent, etc.

Embodiments in which the joint is provided by a film hinge thus constitute very simple means of providing the joints for a fin-ray wiper. The wiper blade 2 may be provided in one piece, in particular in ready-from-the-mold form. According to typical embodiments, the windshield wiper device, in particular the wiper blade, is produced from one or more materials from a group consisting of: TPE (thermoplastic elastomer), for example TPE-S, TPE-O, TPE-U, TPE-A, TPE-V and TPE-E. The film hinges can exhibit high ductility. This can be provided, for example, by means of a material selected from the group PP, PE, POM and PA. Alternatively, the film hinges may be produced from one or more materials from a group consisting of: TPE (thermoplastic elastomer), for example TPE-S, TPE-O, TPE-U, TPE-A, TPE-V and TPE-E. The choice of material from the group consisting of: POM, PA, TPE, in particular TPE-S, TPE-O, TPE-U, TPE-A, TPE-V and TPE-E permits production by an injection molding process, in particular by a two-component injection process.

The connecting elements 18 are spaced apart from one another along the longitudinal extent of the wiper blade 2. The distances between two respective adjacent connecting elements 18 are identical. However, said distances may also be selected so as to differ. The distances are advantageously less than 50 mm, in particular less than 30 mm. In this way, it is possible to ensure particularly great flexibility of the windshield wiper device, in particular of its lower part, and good adaptation to the curvature and changes in curvature of the windshield to be wiped.

FIG. 6A illustrates a distance 22 as representative of the distance between two respective connecting elements 18. In particular in the basic position of the wiper blade 2, the connecting elements 18 are fastened to the lower part 12 such that their longitudinal axes run at angles 26 of between 65° and 115°, in particular between 75° and 105°, with respect to the lower part 12. The angles particularly advantageously lie between 80° and 100°. This advantageously ensures particularly good transmission of a force, which acts on the lower part, to the upper part. Furthermore, a particularly stable windshield wiper device can be achieved in this manner. Corresponding statements apply to the fastenings of the connecting elements 18 to the upper part 10.

FIG. 6A illustrates a longitudinal axis 24 by way of example for the longitudinal axes of the connecting elements 18 and an angle 26 by way of example for the angles between the connecting elements 18 and the lower part 12.

The distances between the upper part 10 and the lower part 12 are defined primarily by the lengths of the connecting elements 18. The lengths of the connecting elements 18 increase from the two outer connecting positions 14, 16 as far as approximately to those locations at which the holder 6 attached to the upper part 10 begins. As a result, in the side view of the wiper blade 2 according to FIG. 6A, upper part 10 and lower part 12 form a double wedge, wherein the tips of the two wedges point in opposite directions. The connecting elements 18 are designed to be resistant to buckling.

FIG. 6B shows a schematic illustration of the wiper blade 2 according to FIG. 6A in a position in which said wiper blade is placed against the windshield 4. Since the windshield 4 has a curvature, contact pressure forces act on the lower part 12 when the wiper blade 2 is placed against the windshield 4. Since the upper part 10 and the lower part 12 are bendable beams and the connecting elements 18 are mounted rotatably on upper part 10 and lower part 12, the upper part 10 and the lower part 12 are displaceable relative to each other. Owing to the compressive forces acting on the lower part 12 from below, the wiper blade 2 bends in the direction from which the compressive forces originate, and is placed precisely against the curvature of the windshield 4.

Owing to the construction of the embodiments described here, in the event of an action of force on the lower part (by means of the windshield 4), the lower part bends in the direction from which the force acts. This is the case owing to the connection of the upper part 10 and of the lower part at a connecting position 14 and/or 16, the shape, and owing to rotary joints at the connection between the connecting elements and the upper and lower parts, respectively.

In the illustration according to FIG. 6B, there is a small distance between wiper blade 2 and the windshield 4, which distance serves here merely for the illustration of the windshield 4 and of the wiper blade 2 and, in reality, is thus substantially not present when the wiper blade 2 is placed against the windshield 4. Furthermore, a wiper lip which is placed onto the windshield 4 is typically located on the lower side of the lower part 12, which side faces away from the upper part 10. For reasons of clarity, the wiper lip is not illustrated in FIGS. 5A and 5B.

A windshield wiper device according to embodiments described here uses the effect of tail fins of certain fish, which under the action of lateral force do not deflect in the direction of pressure, but instead arch in the opposite direction, that is to say in the direction from which the pressure originates. This principle is also referred to as the "fin-ray" principle. As a result, a windshield wiper device according to the embodiments described herein has the advantage of improved adaptation to a windshield of a motor vehicle. In the case of a conventional windshield wiper blade, the upper part thereof is customarily rigid, i.e. it is not of bendable design.

FIG. 6A and 6B show a wiper blade 2 with a longitudinal extent 8 which substantially extends between the connecting positions 14 and 16. Such an arrangement is frequently used for front windshield wipers. Alternatively, however, a windshield wiper device may also have just one connecting position, which, in analogy to FIGS. 6A and 6B, corresponds to a halving of the windshield wiper device, and wherein an axis of rotation is provided, for example, at a position of the holder 6. Such an arrangement is frequently used for rear windshield wipers. This is illustrated by way of example inter alia in FIGS. 7A and 7B. Optional refinements of details as described in the individual embodiments may generally be used for both variants of an arrangement of a windshield wiper device.

Figure 7A:
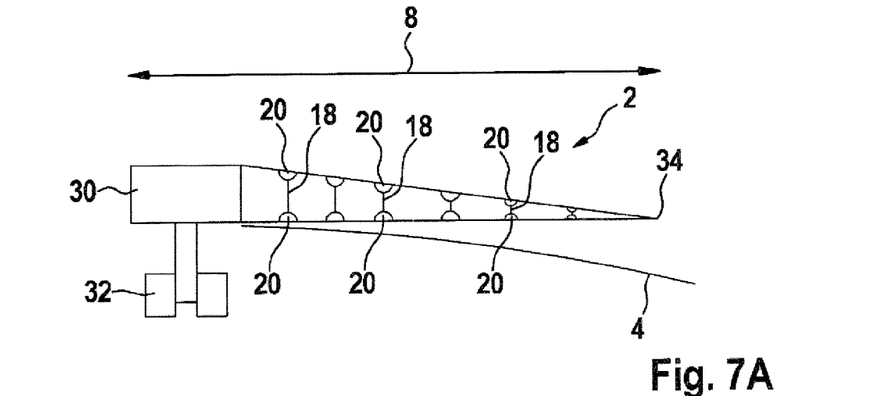
FIG. 7A shows a schematic illustration of a further exemplary embodiment of a windshield wiper device according to the invention in the form of a wiper arm with an integrated wiper blade in a basic position.

FIG. 7A shows a schematic illustration of a further exemplary embodiment of the windshield wiper device according to the invention in the basic position. The windshield wiper device here is a wiper arm with an integrated wiper blade 2 which is attached to a fastening part 30. The fastening part 30 is connected to a wiper motor 32 which drives the fastening part 30 for wiping the windshield 4. The wiper blade 2 is configured in a wedge-shaped manner, wherein one end of the upper part 10 is fixedly connected at an outer connecting position 44 to one end of the lower part 12. The respective other end of the upper part 10 and of the lower part 12 are fastened to the fastening part 30. With regard to the basic construction and in particular the fastenings of the connecting elements 18, the windshield wiper device according to FIG. 7A basically corresponds to that according to FIG. 6A.

Figure 7B:
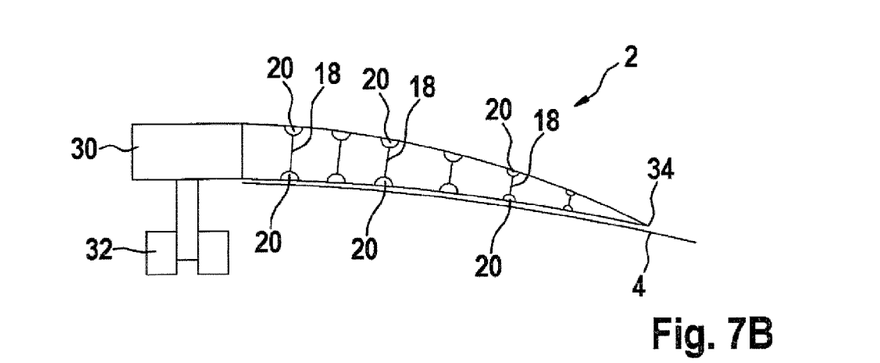
FIG. 7B shows a schematic illustration of the wiper arm with an integrated wiper blade according to FIG. 7A in a position placed against a windshield.

FIG. 7B shows a schematic illustration of the wiper blade 2 with an integrated wiper arm according to FIG. 6B in a position placed against the windshield 4. Compressive forces also act here from below from the direction of the windshield 4 on the lower part 12 of the wiper blade 2, and therefore the lower part 12 and the upper part 10 bend in the direction of the windshield 4.

Both in FIG. 6A and in FIG. 7A, the wiper blade is illustrated in its position in which it is not placed against the windshield, such that the lower part 12 is of substantially rectilinear design. According to yet further embodiments that may be combined with other embodiments, the lower part in the unloaded state is of convex design, that is to say has a curvature that projects away from the upper part in a central region. The windshield wiper device according to the embodiments described here may then typically, upon making contact with a windshield and preceding from the convex shape of the lower part, adopt the corresponding concave shape of the lower part that adapts to the windshield.

Figure 8:
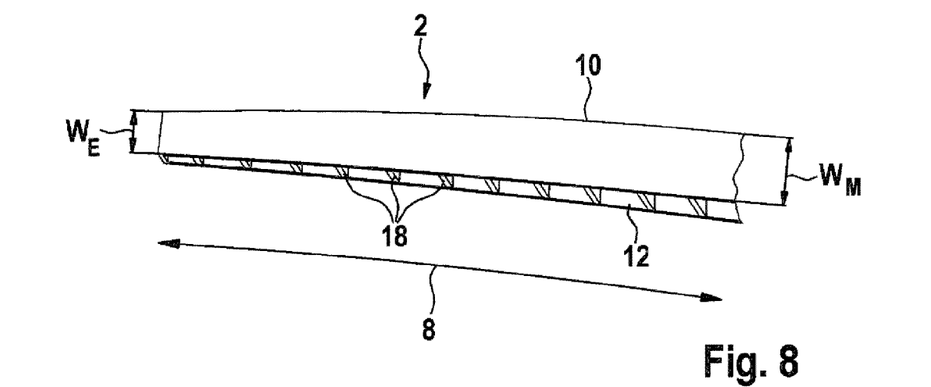
FIG. 8 shows a schematic perspective illustration of a wiper arm of a windshield wiper device according to embodiments of the disclosure.

FIG. 8 shows a schematic perspective illustration of a wiper blade 2 of a windshield wiper device according to embodiments of the disclosure. As is illustrated in FIG. 8, the wiper blade 2 has an outer width $W_E$ at the outer connecting positions at which the ends of the elongate upper part 10 and of the lower part 12 are connected to each other. According to typical embodiments, the outer width $W_E$ is at least 15 mm, in particular at least 20 mm, in particular at least 25 mm.

According to embodiments of the disclosure that may be combined with other embodiments, the width of the wiper blade 2 increases from the outer connecting positions in the direction of the fastening part 30 or the holder 6, at which the wiper blade can be fastened to the windshield wiper arm. An inner width is denoted by $W_M$ by way of example in FIG. 8. According to typical embodiments, the inner width $W_M$ is at least 20 mm, in particular at least 25 mm, in particular at least 30 mm.

Figure 9A:
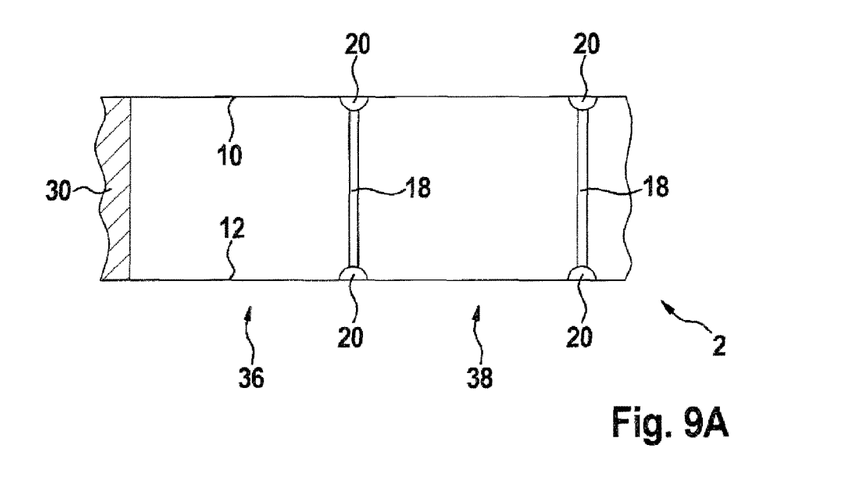
FIG. 9A shows a schematic illustration of a detail of the wiper blade according to FIG. 7A.

FIG. 9A shows a schematic illustration of a detail of the wiper blade 2 according to the exemplary embodiment according to FIG. 7A, in which the wiper blade 2 is in the basic position. The left end region of the wiper blade 2, in which an end of the upper part 10 and an end of the lower part 12 are fastened to the fastening part 30, is illustrated. FIG. 9A shows, starting from the transition from the fastening part 30 to the wiper blade 2, the first two connecting elements 18 which bound two wiper blade elements 36 and 38. The connecting elements 18 are fastened to the upper part 10 and to the lower part 12 via rotary joints 20.

Figure 9B:
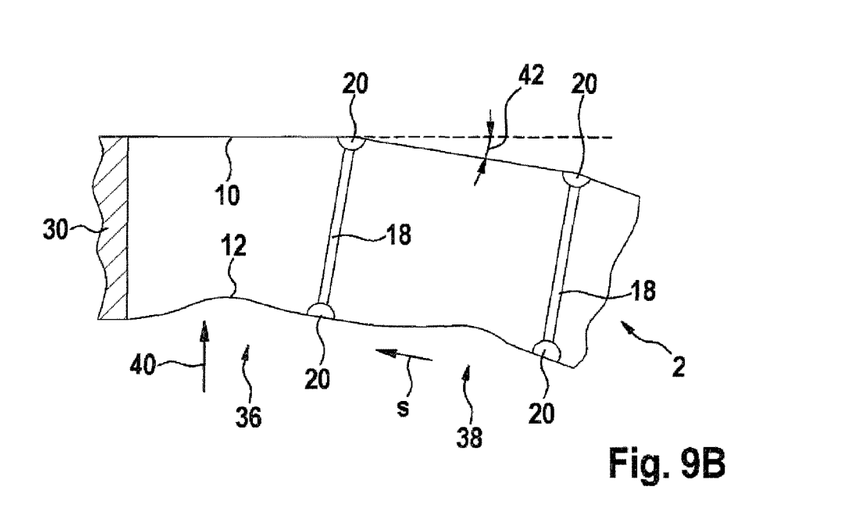
FIG. 9B shows a schematic illustration of a detail of the wiper blade according to FIG. 7B.

FIG. 9B shows a schematic illustration of a detail of the wiper blade 2 according to the exemplary embodiment according to FIG. 7B, in which the wiper blade 2 is placed against the windshield 4. Compressive forces act from below from the direction of the windshield on the lower part 12. A compressive force 40 is illustrated in FIG. 9B as representative of the compressive forces. The compressive force 40 brings about an arching and distortion of the lower part 12 of the wiper blade element 36. As a result, the rotary joint 20 of the first connecting element 18 is displaced to the left by a distance s. The second wiper blade element 38 bends downwards in the direction from which the compressive force 40 comes, and nestles against the windshield. An angle 42 arises here between the first wiper blade element 36 and the second wiper blade element 38. Furthermore, a further compressive force is formed which then acts on the lower part 12 of the second wiper blade element 38 and prevents further distortion of the second wiper blade element 38 downward. A chain reaction arises in relation to the right adjacent wiper blade element as far as the end of the wiper blade 2.

According to the embodiments described here, fin-ray windshield wiper devices for vehicle windshields can be produced in a particularly advantageous manner and/or for a plurality of different fields of use. The present embodiments of the windshield wiper device with the pretensioning device according to the embodiments described here permit particularly good adaptation to the curvature of a windshield. This ensures a particularly good and exact wiping of the windshield. Unwiped regions of the windshield and smearing on the windshield can be substantially avoided. The structural refinement of the pretensioning device described herein permits a substantially uniform contact pressure of the windshield wiper device on the windshield, and therefore high wiping quality is provided.

The connecting element 18, in particular outside its rotary joints 20, has a thickness which is greater than or equal to 0.4 millimeter. In particular, this thickness is less than 3 millimeters, preferably between 0.6 millimeter and 2 millimeters, ideally approximately 1 millimeter to 1.7 millimeters, for example approximately 1.5 millimeters.

Furthermore, the connecting element 18 is of substantially buckle-proof or flexurally rigid design. This means that the latter are designed in such a manner that they permit a movement of the upper part 10 and of the lower part 12 relative to each other with a movement component along the longitudinal extent 8 of the wiper blade 2. In this case, the connecting elements are connected to the upper part 10 at a respective upper connecting position and to the lower part 12 at a respective lower connecting position. For example, a rotary joint 20 is provided at each of the connecting positions. During a movement of the upper part 10 and of the lower part 12 relative to each other, the distance of an upper connecting position from a lower connecting position on the same connecting element substantially does not change, i.e. the distance is constant with deviations of, for example, ±1 mm, in particular ±0.3 mm.

What is claimed is:

1. A windshield wiper device for a vehicle, comprising a wiper blade (2) with
   an elongate upper part (10), which is configured to be at least partially bendable,
   an elongate lower part (12), which is configured to be at least partially bendable, and
   a plurality of connecting elements (18) connecting the upper part (10) and the lower part (12), wherein the connecting elements (18) are spaced apart from one another along a longitudinal extent (8) of the windshield wiper device, and wherein the connecting elements (18) are configured in order to permit a movement of the upper part (10) and of the lower part relative to each other with a movement component along the longitudinal extent (8) of the windshield wiper device, wherein the connecting elements (18) substantially have a thickness of greater than or equal to 0.4 millimeter, and a pretensioning device (50), wherein the pretensioning device (50) comprises a force absorption element (32) which is connected to a force transmission element (33), and therefore, in the event of an action of force on the force absorption element (32) in the direction of the elongate lower part (12), a rotational movement of the force transmission element (33) is brought about, as a result of which a movement of the elongate upper part (10) relative to the elongate lower part (12) results, with a movement component along the longitudinal extent (8) of the windshield wiper device;

wherein the force transmission element (33) is connected at a first end via a first rotary joint (37) to the elongate upper part (10), and wherein the force transmission element (33) is connected at a second end via a second rotary joint (36) to the force absorption element (32).

2. The windshield wiper device as claimed in claim 1, wherein the pretensioning device (50) comprises a stop (31), which is spaced apart from the lower part (12), in order to determine a ratio between a pretensioning force and a contact pressure force of the windshield wiper device (100).

3. The windshield wiper device as claimed in claim 2, wherein the stop (31) is connected to the force absorption element (32), and wherein the stop (31) is configured in order, in the event of an action of force on the force absorption element (32), to limit a movement of the force absorption element (32) in the direction of the elongate lower part (12) to a maximum movement distance of 20 mm.

4. The windshield wiper device as claimed in claim 2, wherein the stop (31) is configured in the shape of a pin and is arranged in order to form a stop with the elongate lower part (12) at the maximum movement distance of the force absorption element (32).

5. The windshield wiper device as claimed in claim 2, wherein the stop (31) is configured in order to transmit a force of at least 10 N to the elongate lower part (12).

6. The windshield wiper device as claimed in claim 2, wherein the stop (31) is connected to the force absorption element (32), and wherein the stop (31) is configured in order, in the event of an action of force on the force absorption element (32), to limit a movement of the force absorption element (32) in the direction of the elongate lower part (12) to a maximum movement distance of 15 mm.

7. The windshield wiper device as claimed in claim 2, wherein the stop (31) is connected to the force absorption element (32), and wherein the stop (31) is configured in order, in the event of an action of force on the force absorption element (32), to limit a movement of the force absorption element (32) in the direction of the elongate lower part (12) to a maximum movement distance of 10 mm.

8. The windshield wiper device as claimed in claim 2, wherein the stop (31) is configured in order to transmit a force of at least 15 N to the elongate lower part (12).

9. The windshield wiper device as claimed in claim 2, wherein the stop (31) is configured in order to transmit a force of at least 20 N to the elongate lower part (12).

10. The windshield wiper device as claimed in claim 1, wherein the force transmission element (33) is arranged in such a manner that, in an unloaded state of the windshield wiper device, an angle $\alpha$ between a longitudinal axis (35) of the force transmission element (33) and an axis (38) that is perpendicular to a direction of movement (50) of the force absorption element (33) is within an angular range of at least 15° to at maximum 60°.

11. The windshield wiper device as claimed in claim 1, further comprising a guide (34) configured to guide a movement of the force absorption element (32) in the direction of the elongate lower part (12).

12. The windshield wiper device as claimed in claim 1, further comprising a wiper arm (40) configured to exert a compressive force on the force absorption element.

13. The windshield wiper device as claimed in claim 1, further comprising a tension generation device (41) configured to exert a tensile force on the force absorption element.

14. The windshield wiper device as claimed in claim 1, wherein the force transmission element (33) is arranged in such a manner that, in an unloaded state of the windshield wiper device, an angle $\alpha$ between a longitudinal axis (35) of the force transmission element (33) and an axis (38) that is perpendicular to a direction of movement (50) of the force absorption element (33) is within an angular range of at least 20° to at maximum 45°.

15. The windshield wiper device as claimed in claim 1, wherein the force transmission element (33) and the force absorption element (32) are each a linear linkage element.

16. A windshield wiper device for a vehicle, comprising a wiper blade (2) with
an elongate upper part (10), which is configured to be at least partially bendable,
an elongate lower part (12), which is configured to be at least partially bendable, and
a plurality of connecting elements (18) connecting the upper part (10) and the lower part (12), wherein the connecting elements (18) are spaced apart from one another along a longitudinal extent (8) of the windshield wiper device, and wherein the connecting elements (18) are configured in order to permit a movement of the upper part (10) and of the lower part relative to each other with a movement component along the longitudinal extent (8) of the windshield wiper device, wherein the connecting elements (18) substantially have a thickness of greater than or equal to 0.4 millimeter,
a pretensioning device (50), wherein the pretensioning device (50) comprises a force absorption element (32) which is connected to a force transmission element (33), and therefore, in the event of an action of force on the force absorption element (32) in the direction of the elongate lower part (12), a rotational movement of the force transmission element (33) is brought about, as a result of which a movement of the elongate upper part (10) relative to the elongate lower part (12) results, with a movement component along the longitudinal extent (8) of the windshield wiper device; and
a guide (34) configured to guide a movement of the force absorption element (32) in the direction of the elongate lower part (12).

17. The windshield wiper device as claimed in claim 16, further comprising a tension generation device (41) configured to exert a tensile force on the force absorption element.

18. A windshield wiper device for a vehicle, comprising a wiper blade (2) with
an elongate upper part (10), which is configured to be at least partially bendable,
an elongate lower part (12), which is configured to be at least partially bendable, and a plurality of connecting elements (18) connecting the upper part (10) and the lower part (12), wherein the connecting elements (18) are spaced apart from one another along a longitudinal extent (8) of the windshield wiper device, and wherein the connecting elements (18) are configured in order to permit a movement of the upper part (10) and of the lower part relative to each other with a movement component along the longitudinal extent (8) of the windshield wiper device, wherein the connecting elements (18) substantially have a thickness of greater than or equal to 0.4 millimeter, a pretensioning device (50), wherein the pretensioning device (50) comprises a force absorption element (32) which is connected to a force transmission element (33), and therefore, in the event of an action of force on the force absorption element (32) in the direction of the elongate lower part (12), a rotational movement of the force transmission element (33) is brought about, as a result of which a movement of the elongate upper part (10) relative to the elongate lower part (12) results, with a movement component along the longitudinal extent (8) of the windshield wiper device; and a tension generation device (41) configured to exert a tensile force on the force absorption element.

* * * * *